United States Patent
Matsunaga (10) Patent No.: US 9,172,995 B2
(45) Date of Patent: Oct. 27, 2015

(54) TRANSCODING DEVICE, TRANSCODING METHOD AND PROGRAM THEREOF

(75) Inventor: Mitsuhiro Matsunaga, Kanagawa (JP)

(73) Assignee: RENESAS ELECTRONICS CORPORATION, Kanagawa (JP)

( * ) Notice: Subject to any disclaimer, the term of this patent is extended or adjusted under 35 U.S.C. 154(b) by 729 days.

(21) Appl. No.: 13/191,064

(22) Filed: Jul. 26, 2011

(65) Prior Publication Data

US 2012/0076209 A1    Mar. 29, 2012

(30) Foreign Application Priority Data

Sep. 27, 2010 (JP) ................................ 2010-215471

(51) Int. Cl.
| | |
|---|---|
| *H04N 21/4402* | (2011.01) |
| *H04N 9/804* | (2006.01) |
| *H04N 21/433* | (2011.01) |
| *H04N 21/4385* | (2011.01) |

(52) U.S. Cl.
CPC ......... *H04N 21/4402* (2013.01); *H04N 9/8042* (2013.01); *H04N 21/4334* (2013.01); *H04N 21/4385* (2013.01)

(58) Field of Classification Search
CPC ............ H04N 9/8042; H04N 21/4402; H04N 21/4385; H04N 21/4334; H04N 7/26
USPC ........... 348/462; 375/240.13, 240.25, 240.01; 725/87, 90
See application file for complete search history.

(56) References Cited

U.S. PATENT DOCUMENTS

| | | | | |
|---|---|---|---|---|
| 2005/0108763 | A1* | 5/2005 | Baran et al. | ...................... 725/87 |
| 2007/0146542 | A1* | 6/2007 | Strasser | ........................ 348/462 |
| 2008/0101473 | A1 | 5/2008 | Tanaka et al. | |
| 2008/0267290 | A1* | 10/2008 | Barbieri et al. | ........... 375/240.13 |
| 2010/0011397 | A1* | 1/2010 | Baran et al. | ...................... 725/90 |

FOREIGN PATENT DOCUMENTS

| | | |
|---|---|---|
| JP | 2008-131570 | 6/2008 |
| JP | 2008-136187 | 6/2008 |
| JP | 2008-263404 | 10/2008 |

* cited by examiner

*Primary Examiner* — Geepy Pe
*Assistant Examiner* — Salame Amr
(74) *Attorney, Agent, or Firm* — Young & Thompson (57) ABSTRACT

A device, a method and a program to simplify transcoding of TTS (timestamped transport streams). When transcoding video data in the input TTS, the video processor unit reattaches time stamps in sequence within the applicable frame period of each video frame to each video packet within the applicable video frame after recompression. When transcoding audio data in the input TTS, the audio processor unit reattaches time stamps in sequence within the applicable video frame period of each video frame to each audio packet in the applicable video frame after recompression.

3 Claims, 4 Drawing Sheets

TRANSCODING DEVICE, TRANSCODING METHOD AND PROGRAM THEREOF

CROSS-REFERENCE TO RELATED APPLICATIONS

The disclosure of Japanese Patent Application No. 2010-215471 filed on Sep. 27, 2010 including the specification, drawings and abstract is incorporated herein by reference in its entirety.

BACKGROUND

The present invention relates to transcoding and relates in particular to TTS (timestamped transport stream) transcoding technology.

Time stamps are attached to each packet when sending or storing content data obtained after multiplexing of compressed video data or audio data. Content data containing packets that were all given time stamps are called TTS or timestamped transport streams.

Time stamps are time information for controlling the read timing of the content data. Conventional TTS play devices such as disclosed in Japanese Unexamined Patent Application Publication No. 2008-263404, contain an internal counter that counts the reference clock pulses, compares the time stamp detached from the TTS, with the count value from the counter, and according to those comparison results, controls the timing at which the video data and audio data are output to the decoder.

There are a variety of standards known in the art for compressing video data and include MPEG2 (registered trademark), H.264, VC-1, etc. A decision on whether to compress video data contained within the content data based on one of the standards is made according to the particular application.

In a digital broadcast for example, the video data is often compressed by MPEG2 in applications for transmission systems that transfer content data along transmission paths; and video data is often compressed by H.264 or VC-1 in storage system applications that record the content data onto a recording medium such as a hard disk or optical disk.

Audio data is compressed in the same way according to the content data application based on the different standards.

When recording digital broadcasts for example, content data matching the transmission system application is converted to content data matching the storage system application. In this conversion, the multiplexed video data and audio data are separated from each other, and this video data or audio data or both are then decoded and recompressed by a separate standard, and utilized after remultiplexing.

Conversion is also carried out to reduce the size of the content data for example when copying a large volume of content data to a small capacity recording medium. In this conversion, the multiplexed video data and audio data are separated and this video data or audio data or both are then utilized by decoding, recompressing and then remultiplexing. Recompression may utilize a technique that recompressed the data to a different standard, or a technique that recompresses the data to a higher compression ratio in the same standard.

The process of decoding compressed video data or audio data and then recompressing the data to a separate standard or the same standard at a different compression ratio is called transcoding of the video data or audio data. Japanese Unexamined Patent Application Publication No. 2008-136187 for example disclosed technology for transcoding of MPEG2 video data into H.264 video data.

In the following description in this specification, the process of transcoding and remultiplexing either the audio data or video data or both that are contained in the content data is called content data transcoding or transcode processing.

Audio data and video data are processed separately during transcoding of content data so transcoding of video data and transcoding of audio data, and remultiplexing are usually performed by synchronization from the same clock (pulse).

Figure 5:
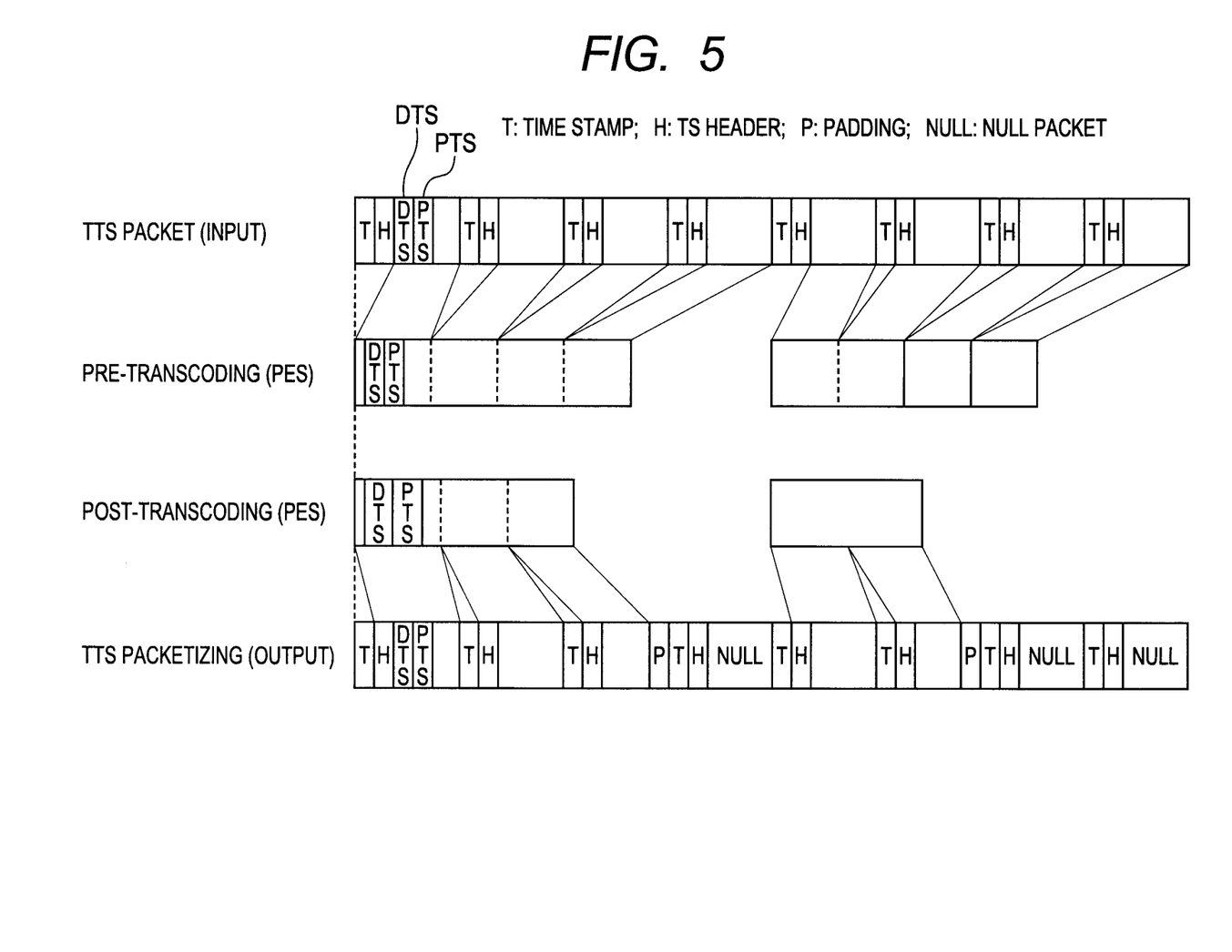
FIG. 5 is a drawing for describing the technology of the related art.

Transcoding of video data or audio data changes the size and the number of packets in the video data or the audio data. Japanese Unexamined Patent Application Publication No. 2008-131570 discloses a technique for avoiding synchronizing errors (lip synch) during remultiplexing of transcoded video data or audio data when the number of packets has decreased due to smaller packet sizes caused by transcoding of the video data or the audio data. This technique is described while referring to FIG. 2 of Japanese Unexamined Patent Application Publication No. 2008-131570 (FIG. 5 in this specification).

In the technique in Japanese Unexamined Patent Application Publication No. 2008-131570, the TTS that was input is separated into video TTS packets and audio TTS packets, made into TTS packets after the respective transcoding processing to obtain TTS video and TTS audio, and is then remultiplexed.

When transcoding and TTS packetizing the video TTS packets for example, the same time stamp as when the TTS was input is still utilized. That process is described next.

This process detects the first PES (packetized elementary stream) packet from the video TTS, obtains the PES packet along with the collective TTS packet payload, and performs transcoding of the acquired PES packet to obtain the transcoding results. The process continues to still utilize the DTS (decoding time stamp) and PTS (presentation time stamp) within the PES packet header. The transcoding results are then overwritten onto the payload section of the TTS packet that was input. The data size of the post-transcoding is small compared to the pre-transcoding data so besides filling in the remaining areas by padding (P in the drawing), unneeded packets among the TTS packets are replaced with NULL packets (NULL in the figure). The above process in this way acquires the post-transcoding video TTS.

The process also transcodes the audio of the TTS packet in the same way to obtain a transcoded audio TTS. The process then compares the TTS that was input, with the time stamp of the post-transcoded audio and video TTS, and replaces the packet that matches the time stamp with the packet that was trans coded.

This technique retains unchanged both before and after transcoding, the same video and audio TTS packet stamps that were first input to prevent synchronization errors during remultiplexing. Moreover, the video data and audio data can be transcoded and remultiplexed asynchronously with no need to utilize the same clock.

SUMMARY

The technique in Japanese Unexamined Patent Application Publication No. 2008-131570 essentially transcodes the video and audio data in each of the plurality of TTS packets contained in the applicable PES packet, and reattaches a time stamp in sequence to each transcoded TTS packet in the applicable PES packet of the TTS that was input. TTS packets that are no longer needed during reattaching are replaced with NULL packets.

This technique therefore replaces the payload section of the packet after obtaining transcoding results for the respective video data and audio data in each PES of the TTS that was input and so requires some form of control in order to cope with a packet quantity that has become smaller than the source stream.

In view of the above circumstances of the related art, the present invention has the object of providing a more simple technique for transcoding content data.

In one aspect of the present invention, a transcoding device obtains an output TTS by transcoding either or both of the video data and audio data for each packet attached with a time stamp contained in the input TTS (timestamped transport stream). The transcoding device is comprised of a video processor unit, an audio processor unit, and a remultiplexer.

To transcode video data, the video processor unit decodes and recompresses the video packet in the input TTS, and reattaches a time stamp to each video packet obtained after recompression. However, if not transcoding video data then the video processor unit outputs unchanged each video packet in the input TTS.

To transcode audio data, the audio processor unit decodes and recompresses the audio packet in the TTS that was input, and reattaches a time stamp to each audio packet obtained after recompression. However, if not transcoding audio data then the video processor unit outputs each audio packet unchanged to the TTS that was input.

The remultiplexer positions the video packets and audio packets output from the video processor unit and audio processor unit in the time sequence shown on each time stamp and obtains the output TTS.

The video processor unit reattaches time stamps in sequence within the applicable video frame period, to each video packet of the applicable video frame, after recompressing each video frame.

The audio processor unit reattaches times stamps in sequence within the applicable video frame period, to each audio packet of the applicable video frame, after recompressing each video frame.

The transcoding device of the present invention described above is also effective and applicable when substituted by methods and systems, or programs executed on a computer serving as the transcoding device, or broadcast devices and recording devices comprised of the applicable transcoding device.

The technology of the aspect of the present invention attaches a time stamp to video packets or to audio packets after recompression based on the video frame period and so along with preventing lip synch deviations, is also capable of simple transcoding of TSS regardless of changes in packet sizes or increases or decreases in packets after recompression.

DETAILED DESCRIPTION

The embodiment of the present invention is described next while referring to the drawings. To clarify the description the following description and drawings have been simplified or omitted as convenient. Moreover, each structural element in the drawings serving as function blocks for implementing the different processes may be comprised of hardware such as a CPU, a memory, and other circuits; or of software such as programs loaded in the memory. Therefore, one skilled in the art can understand that these function blocks can be rendered just by hardware or just by software or by a combination of hardware and software and is not limited by a particular form. The same reference numerals are assigned to the same structural elements in each drawing and redundant descriptions are omitted as needed.

The above programs may be stored in various types of non-transitory computer readable mediums and provided to the computer. Here, non-transitory computer readable mediums include a variety of tangible storage medium types. Typical non-transitory computer readable mediums include magnetic recording mediums (e.g. flexible disks, magnetic tape, hard disk drives), magnetooptical recording mediums (e.g., magnetooptical disks), CD-ROM (read only memories) CD-R, CD-R/W, semiconductor memories, (e.g., mask ROM, PROM (programmable ROM), EPROM (Erasable PROM), flash ROM, RAM (random access memories). The program may also be provided to the computer by various types of transitory computer readable mediums. Typical examples of transitory computer readable mediums include electrical signals, optical signals, and electromagnetic waves. Transitory computer readable mediums can be provided in programs to a computer by way of cable communication paths such as wires and optical fibers or by wireless (radio) communication paths.

Figure 1:
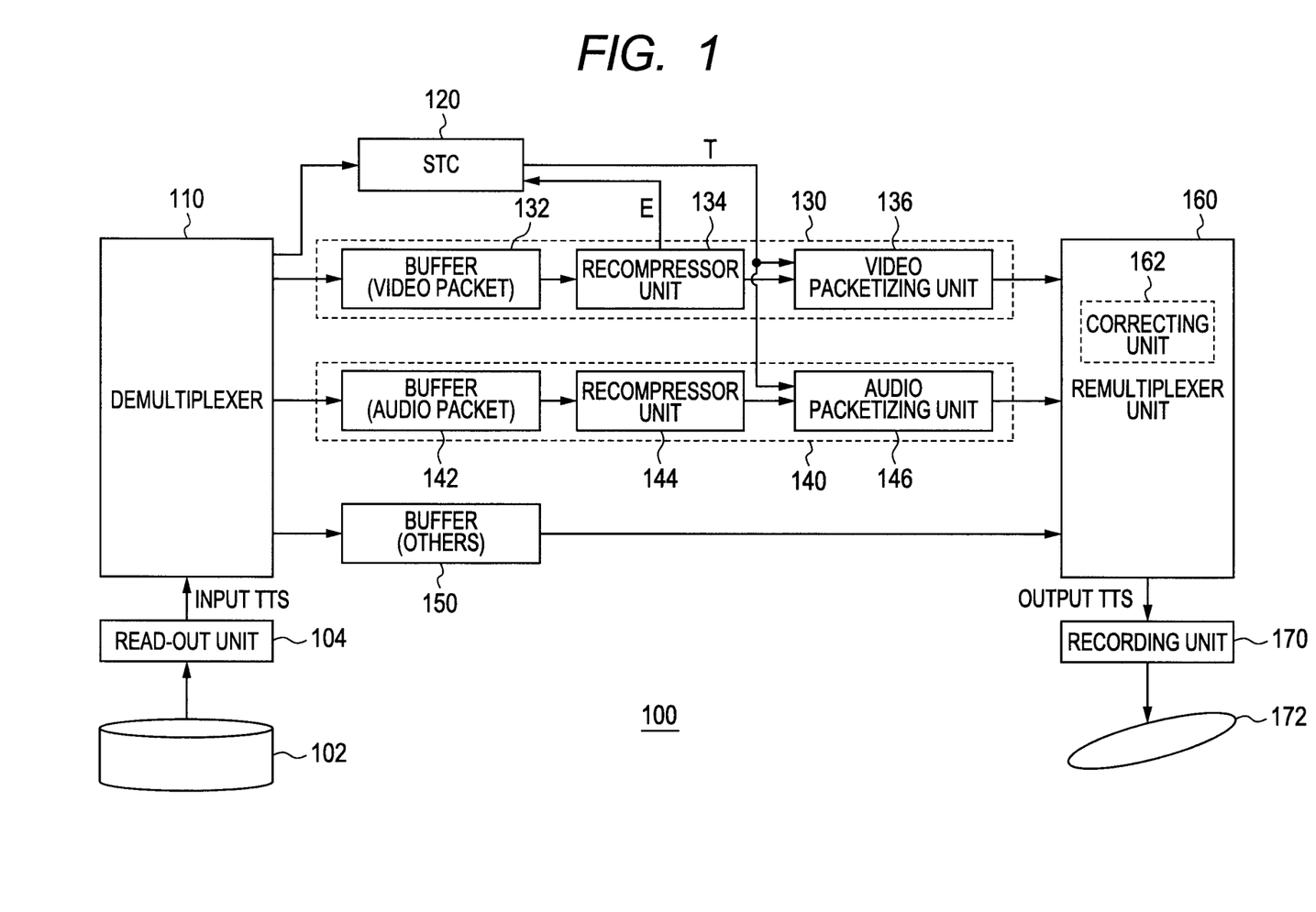
FIG. 1 is a drawing showing the transcoding device relating to the embodiment of the present invention.

FIG. 1 is a drawing showing the transcoding device 100 relating to the embodiment of the present invention. The transcoding device 100 is a device for reading out and transcoding the TTS stored on a recording medium such as a disk 102 serving as the hard disk, and writing on separate recording medium such as the disk 172 serving as the optical disk. A transcoding unit 100 is comprised of a read-out unit 104, demultiplexer 110, STC 120, a video processor unit 130, an audio processor unit 140, a buffer 150, a remultiplexer 160, and a recording unit 170. The video processor unit 130 contains a buffer 132, a recompressor unit 134, and a video packetizer unit 136. The audio processor unit 140 contains a buffer 142, a recompressor unit 144, and an audio packetizer unit 146. The remultiplexer unit 160 contains a correcting unit 162.

The read-out unit 104 reads out the TTS stored on the disk 102 and outputs it to the demultiplexer 110. This TTS that the read-out unit 104 reads out from the disk 102 and inputs to the demultiplexer 110 is hereafter called the input TTS.

This input TTS includes video data packets (video packets), and audio data packets (audio packets), and other packets. Aside from video packets and audio packets, these other packets are for example digital broadcast packets contained in the digital broadcast. These other packets are not recompressed during transcoding of the TTS.

The demultiplexer 110 isolates the video packet, the audio packet, and other packets from the input TTS, and respectively outputs them in sequence to the buffer 132, the buffer 142, and the buffer 150.

The demultiplexer 110 further outputs the packets to the STC 120 in sequence according to the time shown on the time stamp on the first video packet in each video frame in the input TTS. The first video packet in each video frame is hereafter called the "first video packet", and the time shown by the time stamp for the first video packet is called the "start time" of the applicable video frame.

If transcoding video data the recompressor unit 134 decodes and recompresses the video packet stored in the buffer 132, and outputs the video packets obtained by recompression to the video packetizer unit 136 in sequence. If not transcoding video data, then the recompressor unit 134 outputs the video packets stored in the buffer 132 unchanged to the video packetizer unit 136.

The video packets that the demultiplexer 110 outputs to the buffer 132 are hereafter called "input video packets"; and the video packets that the recompressor unit 134 outputs to the packetizer unit 160 are called "output video packets." Output video packets that are not for transcoding are identical to the input video packets and have their original time stamps are attached. If transcoding the video data then no time stamp is attached to the output video packet and items such as the number of packets and packet size are different from the input video packets.

After finishing processing of the final video packet in a single video frame the recompressor unit 134 outputs a completion signal E showing that processing is complete to the STC 120.

If transcoding the audio data, the recompressor unit 144 decodes and recompresses the audio packets stored in the buffer 142 and sends in sequence the audio packets obtained by recompression to the audio packetizer unit 146. If not transcoding the audio data, then the recompressor unit 144 outputs the audio packets stored in the buffer 142 unchanged to the audio packetizer unit 146.

The audio packets that the demultiplexer 110 outputs to the buffer 142 are hereafter called "input audio packets" and the audio packets that the recompressor unit 144 outputs to the audio packetizer unit 146 are hereafter called "output audio packets." If not transcoding the audio data, then the output audio packets are identical to the input audio packets and the original time stamps are attached. If transcoding the audio data, then no time stamp is attached to the output audio packet, and items such as the number of packets and packet size are different from the input video packets.

If not transcoding the video data, then the video packetizer unit 136 sends the output video packets from the recompressor unit 134 unchanged to the remultiplexer unit 160. If transcoding the video data, then the video packetizer unit 136 outputs the output video packets from the recompressor unit 134 after reattaching a time stamp.

If not transcoding the audio data, then the audio packetizer unit 146 sends the output video packets from the recompressor unit 144 unchanged to the remultiplexer unit 160. If transcoding the audio data, then the audio packetizer unit 146 outputs the output video packets from the recompressor unit 144 after reattaching a time stamp.

The video packetizer unit 136 and the audio packetizer unit 146 reattach the time stamps based on the start time T of each video frame reported by the STC 120.

The STC 120 counts up by one each time a completion signal E is received from the recompressor unit 134, and also outputs the start time T for the next video frame after the video frame corresponding to the applicable completion signal E (or in other words the video frame whose processing was completed by the recompressor unit 134) to the video packetizer unit 136 and the audio packetizer unit 146. The STC 120 for example counts up after receiving a completion signal E (3) showing that processing of the third video frame received from the recompressor unit 134 is complete, and also outputs the start time T (4) for the fourth video frame to the video packetizer unit 136 and the audio packetizer unit 146.

The reattaching of the time stamps by the video packetizer unit 136 and the audio packetizer unit 146 is described in detail next.

The remultiplexer unit 160 remultiplexes the video packets from the video packetizer unit 136, and the audio packets from the audio packetizer unit 146, and other packets from the buffer 150, obtains an output TTS and sends the output TTS to the recording unit 170. During remultiplexing, the remultiplexer unit 160 arrays all packets in the time sequence shown by the time stamps. The video packets from the video packetizer unit 136 have a reattached time stamp or an original time stamp as already described, and audio packets from the audio packetizer unit 146 have a reattached time stamp or an original time stamp. Other packets from the buffer 150 are attached with an original time stamp.

The recompressor unit 160 includes a correcting unit 162 to correct the time stamp of the video packets or the audio packets so that the respective times shown on the time stamps do not overlap during the remultiplexing. The correcting unit 162 is described in detail later on.

The recording unit 170 writes the output TTS obtained from the recompressor unit 160 onto the disk 172.

The transcoding device 100 trancodes either or both the video data or audio data contained in the input TTS and obtains the output TTS. Here, the transcoding device 100 operation when transcoding video data in the input TTS and when not transcoding audio data is described while referring to an example in FIG. 2.

Figure 2:
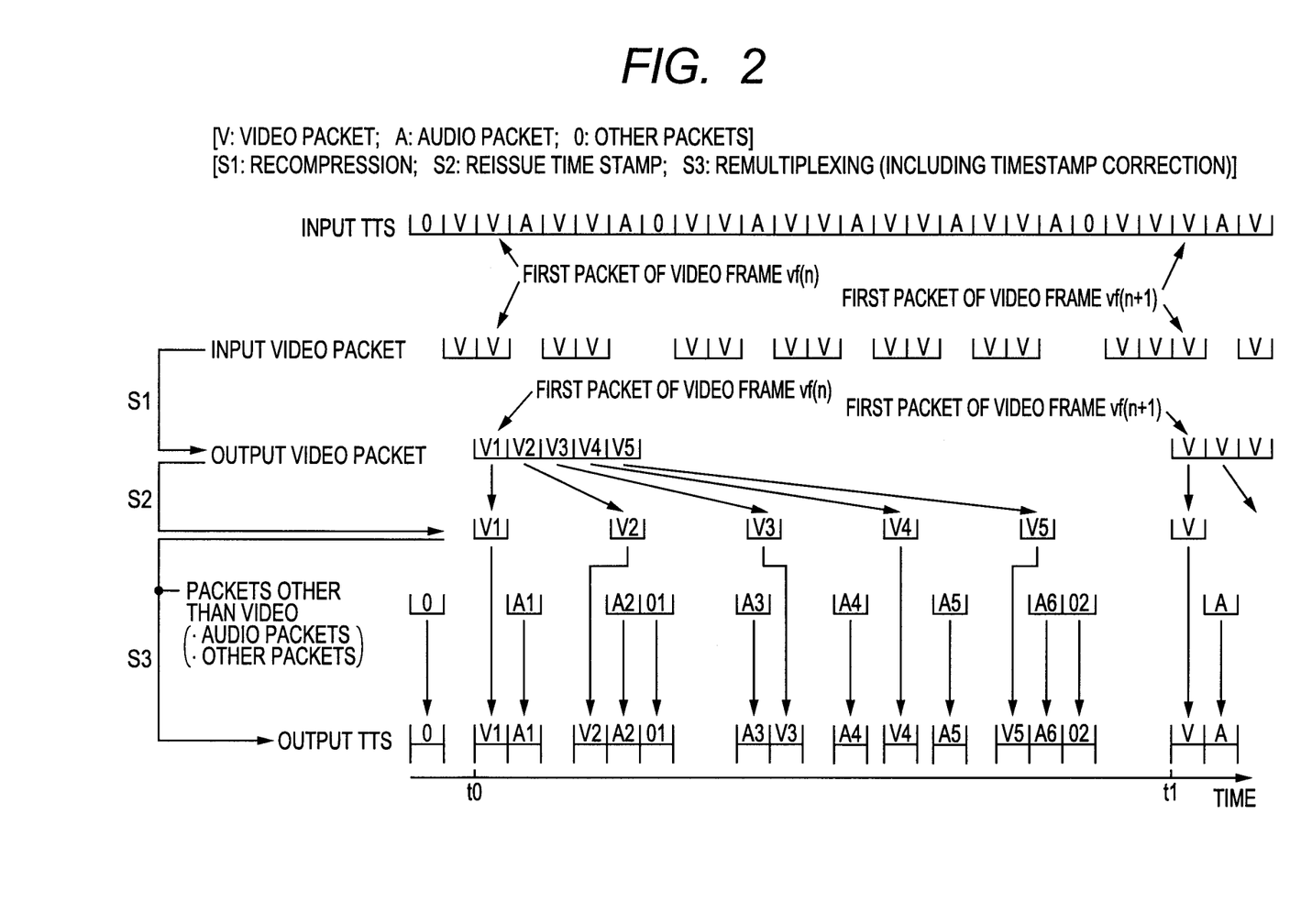
FIG. 2 is a drawing showing an example for describing the operation of the transcoding device shown in FIG. 1.

In FIG. 2, the characters "V", "A", and "O" respectively denote a "video packet", "audio packet", and "other packets." Moreover the horizontal axis indicates the time shown by the time stamp.

First of all, the demultiplexer 110 separates the input video packets, input audio packets, and the other packets from the input TTS and inputs them into the buffer 132, the buffer 142, and the buffer 150. Along with outputting these packets to the respective buffers, the demultiplexer 110 outputs the start time T of each video frame to the STC 120. The demultiplexer 110 for example outputs the start time T (t0 in the figure) of video frame vf(n), and the start time T (t1 in the figure) of video frame vf(n+1) to the STC 120.

The transcoding device 100 only transcodes the video data in example given here, so the recompressor unit 144 of the audio processor unit 140 outputs the input audio packets unchanged to the audio packetizer unit 146 as output audio packets. The time stamp of each output audio packet is therefore the same as the time stamp of the corresponding input audio packet.

The transcoding device does however transcode the video data, so the recompressor unit 134 decodes and recompresses the input video packets that were temporarily stored in the buffer 132 and obtains the output video packets (step S1).

The recompressor unit 134 outputs a completion signal E to the STC 120 each time processing of video packets for a one frame portion is complete. In the example shown in FIG. 2, the recompressor unit 134 obtains the final output video packet of the video frame vf(n) and outputs the completion signal E to the STC 120.

The number of video packets for each single video frame changes as shown in FIG. 2 due to transcoding by the recompression unit 134. The example in FIG. 2 shows recompression at 5/13 on the video packets and therefore 13 video packets in each single video frame are transformed into the five output video packets V1 through V5.

The video packetizer unit 136 reattaches the time stamps to each output video packet (step S2). More specifically, the video packetizer unit 136 reattaches the time stamps in sequence to each output video packet in the applicable video frame and within the time period of the applicable video frame. Here, the video frame time period signifies the period from the start time T of the applicable video frame, up to the start time of the next video frame of the applicable video frame.

In the present embodiment, the video packetizer unit 136 reattaches a time stamp to the output video packets in each video frame so that the times shown by the time stamps in the plural output video packets contained in the applicable video frame are arranged at regularly spaced intervals.

Examine the example shown in FIG. 2. When the recompressor unit 134 completes processing of the video frame prior to video frame vf(n), the STC 120 informs the video packetizer unit 136 of the start time t0 for video frame vf(n) and retains that start time. The recompressor unit 134 then decodes and recompresses the each input video packet of video frame vf(n), and outputs each of the output video packets V1 through V5 of video frame vf(n) to the video packetizer unit 136. When the recompressor unit 134 finishes processing of the video frame vf(n), it informs the video packetizer unit 136 of the start time t1 for the video frame vf(n+1).

The video packetizer unit 136 reattaches the time stamp to the plurality of video frame vf(n) output video packets according to the following formula.

$$t(j)=t0+(j-1)\times((t1-t0)/m) \qquad (1)$$

where, t(j) denotes the output video packet time stamp for j number of video frames vf(n); and m denotes the number of output video packets for the video frame vf(n).

In the example shown in FIG. 2, there are five output video packets in the video frame vf(n) so the following five time stamps: "t0", "t0+(t1−t0)/5", "t0+2×(t1−t0)/5", "t0+3×(t1−t0)/5", "t0+4×(t1−t0)/5" are reattached to the these five output video packets V1 through V5.

In the example shown in FIG. 2, the "t1−t0" is the period of the video frame vf(n). The video packetizer unit 136 reattaches the time stamp to each of the output video packets so that the times shown by the time stamps in the plural output video packets contained in the applicable video frame are at regularly spaced intervals.

When handling audio data on the other hand, the recompressor unit 134 outputs the input audio data packets unchanged as output audio data packets to the audio packetizer unit 146. This audio packetizer unit 146 does not reattach time stamps to the output audio packets.

The video packetizer unit 136, the audio packetizer unit 146 and the buffer 150 respectively output the output video packets with reattached time stamps, output video packets attached with their original time stamps, and other packets, to the remultiplexer unit 160. The other packets were not subjected to recompression and still retain their original time stamps.

As can be seen in FIG. 2, five output video packets V1 through V5, and six output audio packets A1 through A6, and two other packets O1 through O2 for the video frame vf(n) are output to the remultiplexer 160. Among these packets, the video packetizer unit 136 reattaches time stamps to the output video packets V1 through V5, and attaches the original time stamps to the output audio packets A1 through A6, and the other packets O1 through O2.

The remultiplexer 160 remultiplexes these packets and obtains the output TTS (step S3). The remultiplexing is performed in conformance with the procedure below.

(1) The remultiplexer 160 arranges the packets in the time sequence shown by the time stamps attached to each packet.

In this case, a reattached time stamp is utilized on the recompressed packets, and the original time stamp is utilized on packets that were not recompressed.

In this example, the video packets V1 through V5 utilize a time stamp reattached by the video packetizer unit 136; and the audio packets A1 through A6 and other packets O1 through O2 utilize their original time stamps.

(2) When there are packets with overlapping times shown on their time stamps, a correcting unit corrects the time on the time stamps so as to shift either of the packets forward or rearward. The correcting unit 162 makes this correction.

In the example shown in FIG. 2, the time shown by the time stamp for the output video packet V1 does not overlap on times shown on any of the other packet time stamps so the output video packet V1 is positioned prior to the output audio packet A1 just as shown on the time stamp (reattached time stamp).

However the time shown by the time stamp for the output video packet V3 and the time shown by the time stamp for the output audio packet A3 overlap on each other so the correcting unit 162 corrects by shifting the time shown by the output audio packet A3 time stamp to an earlier time. The output video packet V3 is consequently positioned after the output audio packet A3 as the time just as shown on the corrected time stamp.

The above example described the case where transcoding only the video data of the input TTS. If transcoding both the video data and audio data or when transcoding only audio data, then the recompressor 144 decodes and recompresses the input audio data temporarily stored in the buffer 142 and outputs the recompressed data to the audio packetizer unit 146. The audio packetizer unit 146 reattaches time stamps to each output audio packet obtained from the recompressor unit 144.

The video packetizer unit 146 reattaches a time stamp in sequence to each output audio packet corresponding to the applicable video frame so that the times are at regularly spaced intervals within the applicable video frame period.

Here, "each output audio packet corresponding to the applicable video frame" signifies the output audio packet obtained after recompressing the input audio packet containing the time stamp within the period of the applicable video frame.

The transcoding device 100 of the present embodiment in this way, reattaches time stamps to recompressed packets (video packet and/or audio packet) based on the start time of the video frame, and also performs remultiplexing by utilizing reattached time stamps for recompressed packets and utilizing original time stamps for non-recompressed packets. The function blocks for video processor unit 130, the function blocks for the audio processor unit 140, and the remultiplexer 160 are therefore capable of asynchronous operation. Each of the function blocks can therefore perform processing matching its own load; and the transcoding device 100 is overall capable of best effort processing.

Moreover, reattaching a time stamp within the video frame period allows using an optional compression ratio.

Each function block can also operate asynchronously so recompression can be made to start or stop according to an optional timing or according to input of the input TTS or output of the output TTS.

The transcoding device 100 reattaches time stamps to any of the video packets or audio packets based on the video frame start time using the video frame period as a standard and so the device can be kept on a small scale and control is simple requiring only one STC 120.

Figure 3:
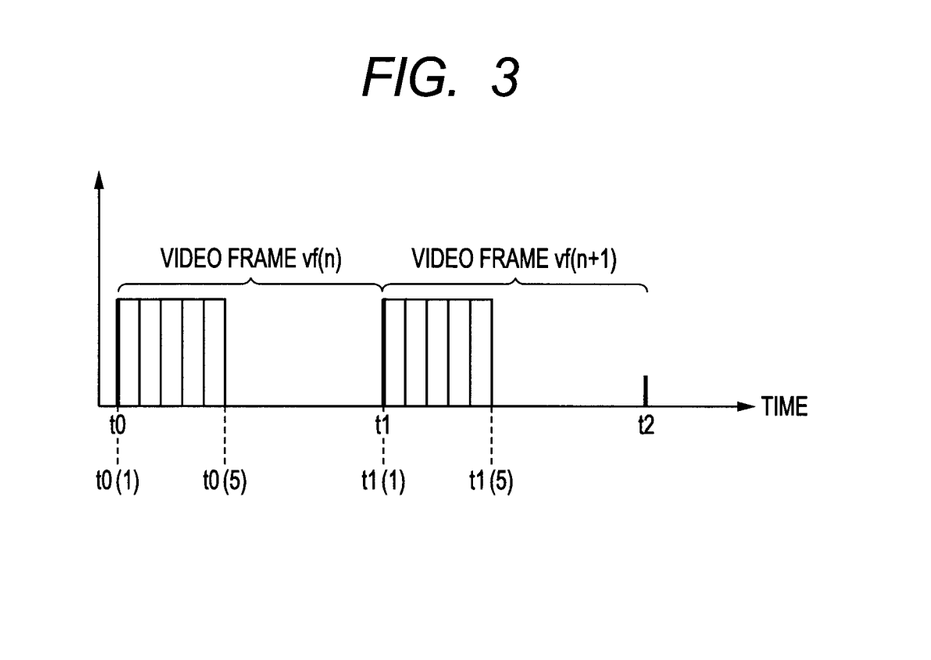
FIG. 3 is a drawing for describing the effect of the technology relating to the present invention (first of two drawings)
Figure 4:
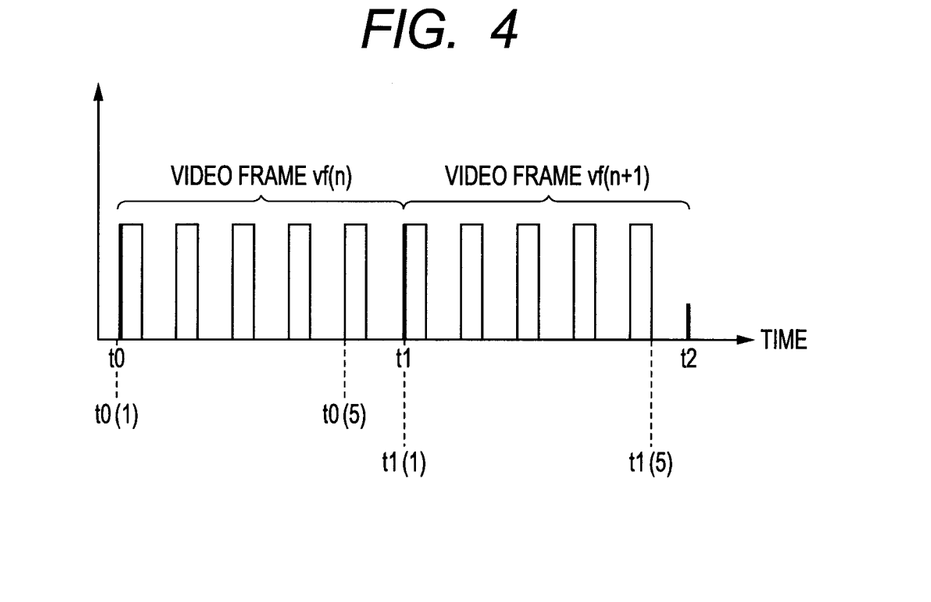
FIG. 4 is a drawing for describing the effect of the technology relating to the present invention (second of two drawings)

Moreover, during reattaching of time stamps to the recompressed packets, the times shown on the time stamps for each packet are arranged at equally spaced intervals along the applicable video frame period so a uniform output TTS bit rate can be achieved as seen by referring to FIG. 3 and FIG. 4. The examples shown in FIG. 3 and FIG. 4 utilizes a total of five packets for a single frame however the number of packets per frame is not limited to five packets.

In each video frame period in the TTS as shown in FIG. 3 for example, and applying time stamps clustered in the first half of the packet, the gap between the time stamp for the first packet and the time stamp for the end packet in each video frame ("t0(5)–t0 (1)" and "t1(5)–t1(1)") is short. Here, in contrast to the period from t0(5) to t1(0), and the period from t1(5) to t2 where the processing device that reads the applicable TTS has no packets to process; each of the five packets must each be processed in the period from t1(1) to t1(5) so a corresponding processing capacity is required.

In FIG. 4 on the other hand, when time stamps are attached within each video frame so that the packets are at equally spaced intervals, the gap between the time stamp for the first packet and the time stamp for the end packet in each video frame becomes long so that a uniform bit rate is achieved. The processing device for reading the applicable TTS therefore need only be capable of processing five packets within a single frame period.

The present invention was described based on the embodiment. The embodiment described here is merely an example, and all manner of changes and additions and reductions in the above embodiment may be made provided there is no departure from the spirit and the scope of the present invention. The fact that variations achieved by making these changes, additions and reductions are within the scope and spirit of the invention is readily apparent to one skilled in the art.

What is claimed is:

1. A transcoding device to transcode either or both the video data or audio data contained in the input TTS (timestamped transport stream) including time stamps attached to each packet, the transcoding device comprising:
    a video processor to decode and recompress the video packets in the input TTS, and to also reattach time stamps in sequence within the applicable frame period of each video frame to each video packet in the applicable video frame after recompression when transcoding video data, and to output each video packet in the input TTS unchanged when not transcoding the video data;
    an audio processor unit to decode and recompress the audio packet in the input TTS and to also reattach time stamps in sequence within the applicable video frame period of each video frame to each audio packet in the applicable video frame after recompression when transcoding the audio data, and to output the audio packet in the input TTS unchanged when not transcoding the audio data; and
    a remultiplexer unit to position the video packets and audio packets output from the video processor unit and audio processor unit in the time sequence shown on each time stamp and obtain the output TTS,
    wherein the video processor unit reattaches the time stamps so that the times shown on the time stamp of each video packet after recompression are arranged at regularly spaced intervals within the period of the applicable video frame,
    wherein the audio processor unit reattaches the time stamps so that the times shown on the time stamp of each audio packet after recompression are arranged at regularly spaced intervals within the period of the applicable video frame, and
    wherein the remultiplexer unit includes a correcting unit to correct the time stamps of the video packets or the audio packets so that the respective times shown on the time stamps do not overlap during remultiplexing.

2. A transcoding method for a transcoding device to transcode either or both the video data or audio data contained in the input TTS (timestamped transport stream) including time stamps attached to each packet, the transcoding method comprising the steps of:
    executing video processing that decodes and recompresses the video packets in the input TTS, and also reattaches time stamps in sequence within the applicable video frame period of each video frame to each video packet for the applicable video frame after recompression when transcoding video data; and that outputs each video packet in the input TTS unchanged when not transcoding video data;
    executing audio processing that decodes and recompresses the audio packet in the input TTS and also reattaches time stamps in sequence within the applicable video frame period of each video frame to each audio packet for the applicable video frame after recompression when transcoding audio data; and that outputs each audio packet in the input TTS unchanged when not transcoding audio data; and
    executing remultiplexing processing that positions the video packets and audio packets obtained from the video processing and the audio processing in the time sequence shown on each time stamp and that obtains the output TTS,
    wherein the executing video processing step includes reattaching the time stamps so that the times shown on the time stamp of each video packet after recompression are arranged at regularly spaced intervals within the period of the applicable video frame,
    wherein the audio processor unit reattaches the time stamps so that the times shown on the time stamp of each audio packet after recompression are arranged at regularly spaced intervals within the period of the applicable video frame, and
    wherein the remultiplexer unit includes a correcting unit to correct the time stamps of the video packets or the audio packets so that the respective times shown on the time stamps do not overlap during remultiplexing.

3. A non-transient computer readable medium storing a program causing a computer to execute a process to transcode either or both the video data and audio data contained in the input TTS (timestamped transport stream) including time stamps attached to each packet, and obtain the output TTS, the process comprising the steps of:
    executing video processing to decode and recompress the video packets in the input TTS, and also reattach time stamps in sequence within the applicable video frame period of each video frame to each video packet for the applicable video frame after recompression when transcoding the video data; and to output each video packet in the input TTS unchanged when not transcoding the video data;
    executing audio processing to decode and recompress the audio packet in the input TTS and also reattach time stamps in sequence within the applicable video frame period of each video frame to each audio packet for the applicable video frame after recompression when transcoding audio data; and to output each audio packet in the input TTS unchanged when not transcoding audio data; and executing remultiplexing processing to position the video packets and audio packets obtained from the video processing and the audio processing in the time sequence shown on each time stamp and to obtain the output TTS, wherein the executing video processing step includes reattaching the time stamps so that the times shown on the time stamp of each video packet after recompression are arranged at regularly spaced intervals within the period of the applicable video frame, wherein the audio processor unit reattaches the time stamps so that the times shown on the time stamp of each audio packet after recompression are arranged at regularly spaced intervals within the period of the applicable video frame, and wherein the remultiplexer unit includes a correcting unit to correct the time stamps of the video packets or the audio packets so that the respective times shown on the time stamps do not overlap during remultiplexing.

* * * * *